United States Patent [19]

Swanson

[11] 4,044,697
[45] Aug. 30, 1977

[54] NO TILL SEED DRILL

[76] Inventor: Morton C. Swanson, P.O. Box 214, Palouse, Wash. 99161

[21] Appl. No.: 571,947

[22] Filed: Apr. 28, 1975

[51] Int. Cl.² .......................... A01C 5/08; A01B 63/00
[52] U.S. Cl. ........................................ 111/66; 111/88; 111/73; 172/9; 172/464
[58] Field of Search ........................... 111/1, 6–7, 111/8–9, 52–88, DIG. 1; 172/9, 464–466, 491, 261, 263

[56] References Cited

U.S. PATENT DOCUMENTS

| 745,655 | 12/1903 | Packham | 111/88 |
| 1,104,725 | 7/1914 | Aspinwall | 111/88 |
| 1,808,759 | 6/1931 | Bickerton | 172/464 |
| 2,155,443 | 4/1939 | Parks et al. | 111/66 |
| 2,605,686 | 8/1952 | Starr | 172/466 |
| 3,507,233 | 4/1970 | Greig et al. | 111/85 |
| 3,513,790 | 5/1970 | Olsson | 111/88 |

FOREIGN PATENT DOCUMENTS 2,006,052  8/1971  Germany .......................... 111/88

Primary Examiner—Robert E. Bagwill
Attorney, Agent, or Firm—Wells, St. John & Roberts

[57] ABSTRACT

A seed drill for a field left in stubble, comprising a plurality of pairs of discs wherein each pair includes a forward coulter disc tangentially engaging a rearward furrow opening disc held by clevis members to a wheel supported framework. Seeds are directed between the disc pairs to fall therebetween to a point of convergence between the two discs. Forward rotation of the discs cause the seeds to be separated and evenly spaced apart as the seed drill is moved along a forward path of travel. A hydraulic system is provided wherein the pairs of discs are forced downwardy by ram cylinders connected between each clevis member and the framework. The ram cylinders are connected in a parallel hudraulic circuit to a pressure supply source so an even amount of downward pressure is applied to each of the disc pairs.

10 Claims, 5 Drawing Figures

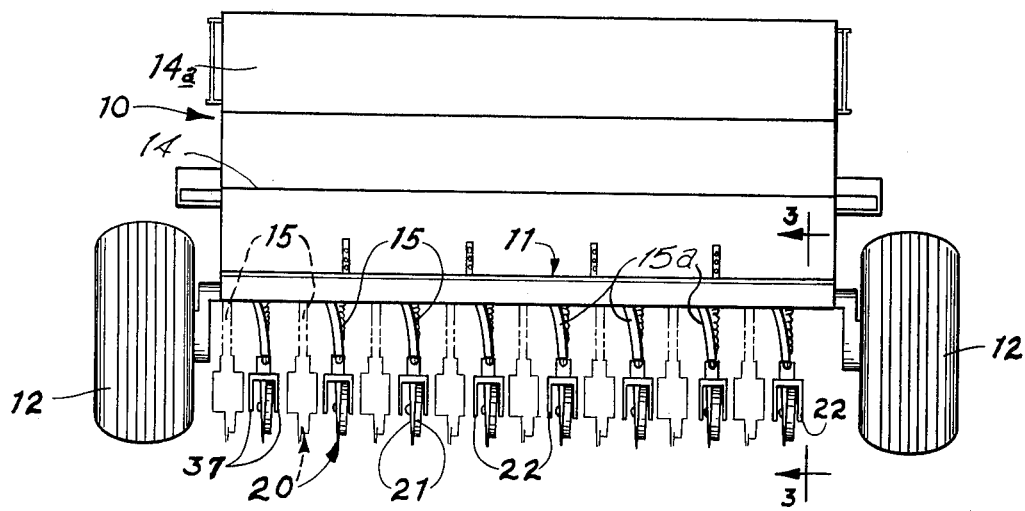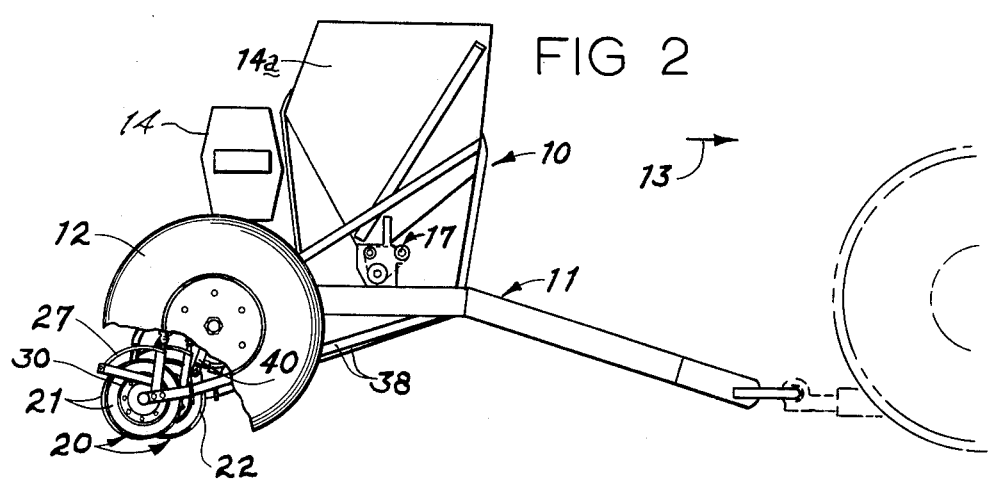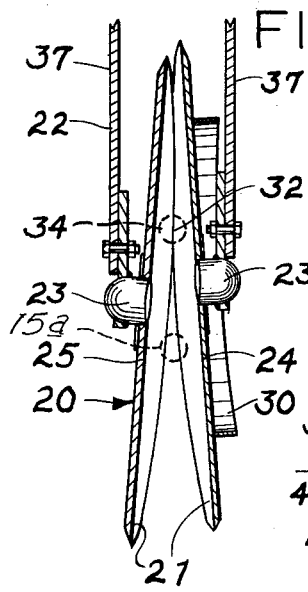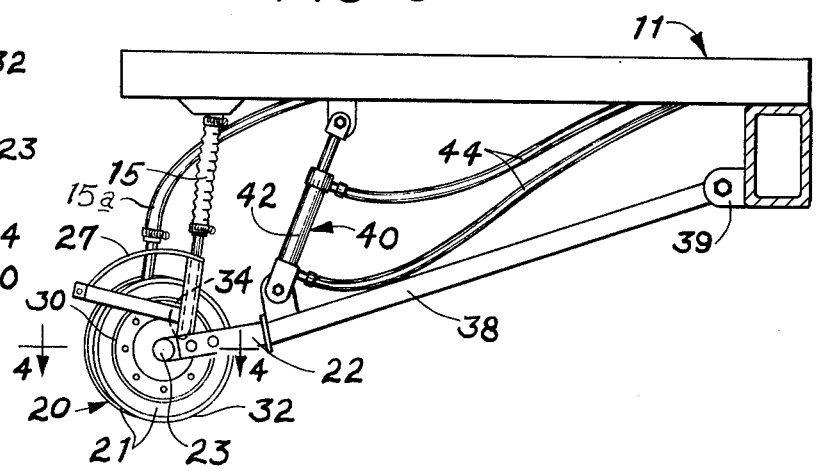

NO TILL SEED DRILL

BACKGROUND OF THE INVENTION

The present invention is related to seed drills and more particularly to such seed drills for planting seeds in a field of stubble without requiring a previous tillage operation.

"No till" farming has recently gained in popularity among conservationists and economically minded farmers as a solution to erosion, fuel consumption, irrigation, and fertilizer runoff. The "no till" concept simply removes the step of tilling the stubble from a previous crop prior to planting the next successive crop. Instead, the next crop is planted directly in the stubble. The stubble is very effective in holding moisture within the soil regardless of terrain conditions. This moisture-holding characteristic also serves to hold beneficial fertilizer in place rather than allowing it to run off with excess water to pollute nearby water sources. Stubble slows wind movement adjacent to the ground surface and therefore reduces evaporation and insulates the ground against chill. Seed placed evenly at an optimum depth on firm soil and covered by a loose high humus soil requires less moisture to start growth. Further, the insulation quality of the stubble is conductive to early plant emergence and adds protection against winter damage.

The "no till" farming method is further beneficial in that labor is saved through fewer required operations. Fuel is also saved. The "no till" operation can be effectively introduced once a field has been cleaned of undesirable weeds. This may be done with an appropriate herbicide. The herbicide is utilized to a prescribed soil depth with the new seeds being planted below that level.

The soil in a stubble field is ordinarily very hard and difficult to penetrate. For this reason, a seed drill must produce a substantial downward force against the drills in order to effectively penetrate the ground to a desired depth. For this reason, it has become desirable to produce a seed drill that will effectively penetrate such hardened ground and control the penetration in accordance to the terrain being planted.

In addition, with the increasing cost of seed, it is becoming increasingly desirable to utilize efficient seed planting equipment. Often seed drills include a form of metering device wherein spaced groups of seeds are allowed to fall from a seed dispensing chute to furrows formed in the ground. Although this procedure is serviceable, the individual seeds of each group are located to closely to one another within the furrow to enable proper growth of each individual seed.

U.S. Pat. No. 530,962 to F. R. Packham discloses a seeding machine utilizing a pair of converging discs with a seed dispensing tube disposed intermediate the diverging sides of the discs. In operation, the discs rotate in response to forward movement along the ground to form a V shaped furrow into which seed is dropped through the seed discharge tube. The discharge tube is located rearwardly of the point of convergence of the two discs in order to drop seeds directly into the open furrow. The discs therefore are utilized only to open a furrow and are not utilized for the purpose of spreading seed along the furrow.

The U.S. Pat. No. 1,104,725 to L. A. Aspinwall discloses a potato planter that utilizes an offset pair of angularly oriented discs for opening a furrow in the ground. Potatoes are planted directly behind the discs as the apparatus is moved along the ground. Again, these discs are not utilized to receive and space seed of any kind.

U.S. Pat. Nos. 3,762,480; 3,749,035; and 2,567,107 all disclose apparatus for adjusting the cutting depth or seed planting depth of a plow or drill. U.S. Pat. No. 3,749,035 to Cayton et al discloses in particular a hydraulic ram arrangement for utilization with independent seed planting and furrow opening mechanisms to provide precision planting depth of the seeds. The hydraulic actuators of this device are connected in a parallel hydraulic circuit and are connected to a sensing unit that automatically regulates pressure therein in response to soil hardness. The components are designed so pressure change in the fluid lines is of a required magnitude in order to maintain a constant furrow depth.

The "no till" seed drill of the present invention was designed specifically for "no till" type of farming and includes specific provisions to enable penetration of hardened stubble soil for fertilizing and seed planting. The present drill includes a heavy framework that mounts a plurality of pairs of discs. Each pair includes a forward coulter disc and a rearward furrow opening disc. The discs are angularly oriented so they converge to a point of tangential engagement forward of the axis of the disc. A seed dispensing chute or tube is located directly above the point of convergence in order that seeds may drop thereon to engage both discs and be held thereby before being moved rearwardly and subsequently dropped into the furrow formed by the two discs. The rotational action of the discs against one another serve to evenly spread the seed apart within the furrows. A hydraulic system is included and connected between the furrow opening discs and seed drill framework in order to provide a constant equal amount of substantial downward pressure between each pair of discs and the heavy framework as the apparatus is moved along. An annular flange is provided on each coulter disc to control the furrow depth.

SUMMARY OF THE INVENTION

A tractor drawn "no till" seed drill is described for planting seeds in previously harvested plots that have not been tilled since harvest with the seeds spaced evenly in relation to one another along a furrow in the ground as the drill is moved in a forward path. The seed drill includes a wheel supported framework having a hopper mounted thereon for receiving bulk seeds. A seed delivery tube extends downwardly from the seed hopper to an open end between a coulter and a furrow opening disc. The coulter disc is operatively connected to the framework for rotation about a first axis and the furrow opening disc is operatively connected to the framework for rotation about a second axis inclined to and rearward of the first axis. The furrow opening disc and coulter disc engage tangentially at a point of convergence elevationally below the first and second axis with the seed delivery tube opening located directly above.

It is a primary object of my invention to provide a seed drill that will efficiently and effectively operate in a "no till" farming operation to plant seed directly into stubble land that has not been previously tilled under.

A further object is to provide such a seed drill that will simply and efficiently spread seed evenly along furrows formed in the ground.

It is a further object to provide such a seed drill that will effectively operate in stubble land to plant seeds at a selected depth regardless of the terrain conditions and soil hardness.

It is an additional object to provide such a "no till" seed drill wherein the furrow opening elements and seed spacing means are combined in a single unit.

It is a still further object to provide such a drill that is simple in construction and therefore easy to operate and maintain.

These and yet further objects and distinct advantages will become apparent upon reading the following description which, taken with the accompanying drawings describe a preferred form of my invention.

Brief Description of the Drawings

FIG. 1 is a rear elevation view of a seed drill incorporating my invention;

FIG. 2 is a side elevational view of my seed drill;

FIG. 3 is a detailed fragmentary view of a single pair of discs incorporated with my invention taken substantially along line 3—3 in FIG. 1;

FIG. 4 is a section view taken along line 4—4 in FIG. 3; and

Detailed Description of a Preferred Embodiment

Figure 5:
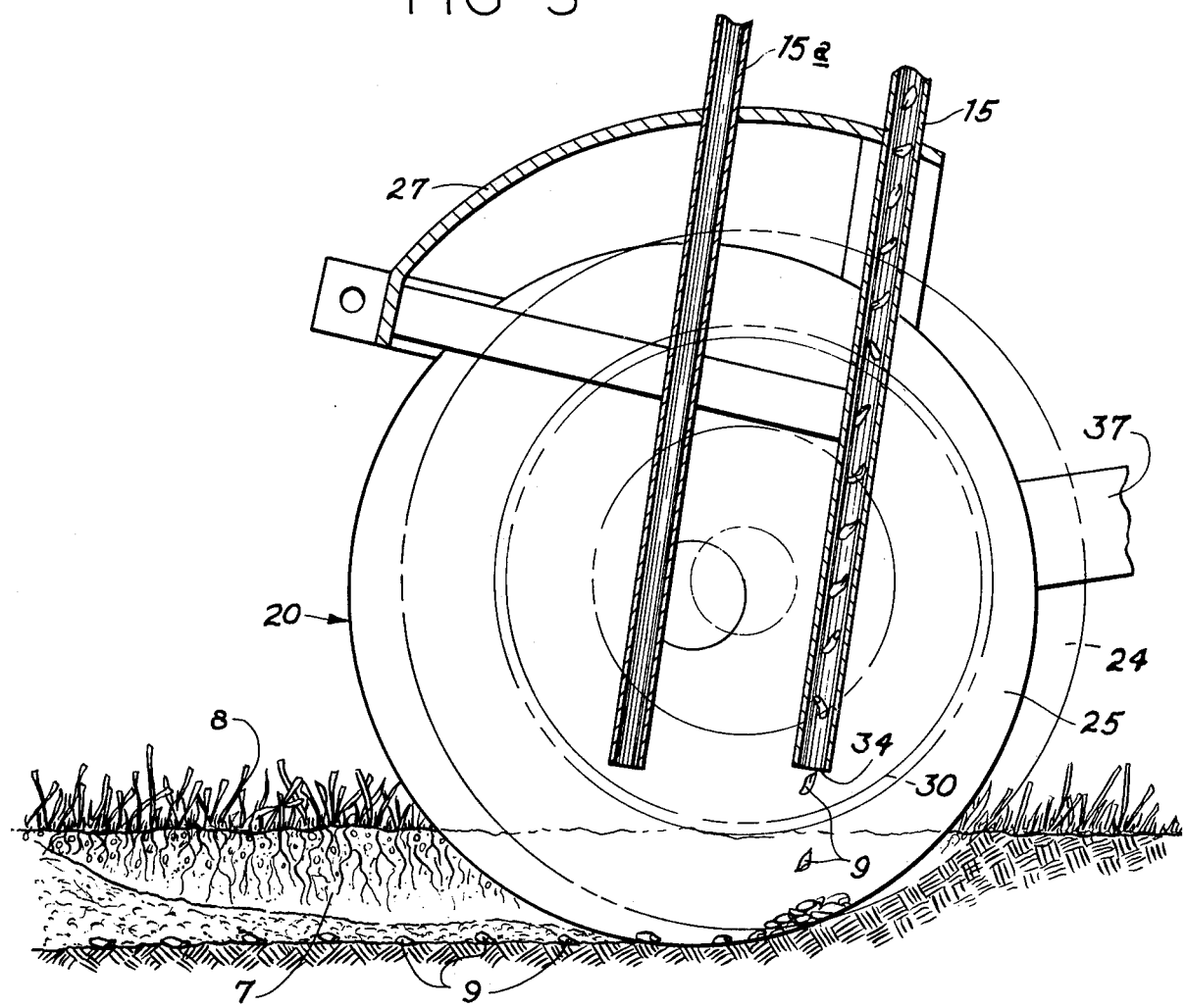
FIG. 5 is an enlarged cross sectional side view showing the discs in operation.

A "no till" seed drill of a preferred form of my invention is illustrated generally in the accompanying drawings and is designated therein by reference character 10. Seed drill 10 is designed specifically to operate in "no till" farming operations wherein seed is planted directly into soil that has not been previously tilled after a prior harvesting operation. FIG. 5 illustrates the operating elements of the present drill in association with such a soil condition wherein seeds 9 are planted directly into the earth 7 beneath the surface stubble and chaff 8.

The seed drill 10 includes a supporting framework 11 that is, by design, of a very heavy nature (preferably 15,000 to 25,000 lbs. when loaded). The frame 11 is adapted to be connected to a draft vehicle (FIG. 2) for movement in a forward direction as indicated in FIG. 2 by arrow 13. A seed hopper 14 and a fertilizer hopper 14a are mounted to framework 11 to receive seeds and fertilizer in bulk quantity. A conventional metered discharge 17 is provided on hopper 14 to receive and distribute measured amounts of seeds from hopper 14 and to deliver the seeds through discharge tubes 15 to a plurality of seed planter assemblies 20. Likewise, a plurality of fertilizer discharge tubes 15a are provided extending from the fertilizer hopper 14a to a discharge point within the seed planter assemblies 20 rearward of the openings of the seed discharge tubes 15.

Seed planter assemblies 20 and elements associated therewith comprise the essential features of the present invention. Looking more particularly to FIGS. 2 and 3, it will be seen that each seed planter assembly is comprised of a pair of discs 21 rotatably mounted to a clevis member 22. Each pair of discs 21 includes a forward coulter disc 24 and a rearward furrow opening disc 25. The disc pairs 21 are rotatably held within journal bearings 23 provided on clevis 22.

As seen in FIG. 4 the coulter disc 24 rotates about a first axis while the furrow opening discs 25 rotate about a second axis inclined with respect to the first axis. This angle of inclination is sufficient along with the location of the discs 24 and 25 to cause the discs to meet at a point of convergence 32 forward and downward of the respective disc axes. The angular relationship of the discs leaves the upward part or that portion of the discs located above the axes in a diverging condition. The space between the converging discs above the first and second axes is protected by an arcuate housing or shield 27.

The discharge tubes 15 are situated on the assemblies to connect with shields 27 and position discharge tube ends 34 directly above the points of convergence 32. This condition is essential to proper functioning of my apparatus and will be discussed in greater detail below.

Each of the clevis members 22 include furcations 37 at one end thereof for receiving and journaling the discs 24 and 25. The remaining pivoted end 38 is mounted to a tab 39 on the framework 11 for pivotal movement about a horizontal axis. This pivotal movement is relatively free and is governed by the terrain as the drill is moved, and by a cylinder means 40 as shown in FIG. 3. Cylinder means 40 is comprised of a plurality of double acting ram cylinders 42, each connected between the framework 11 and a respective clevis member 22. Hydraulic fluid lines 44 connect the double acting cylinders 42 in a parallel hydraulic circuit to a pressure means conventionally supplied by the towing vehicle (usually a tractor). By providing an independent hydraulic cylinder for each of the clevis members 22 and by connecting the cylinders in a parallel circuit, I am able to maintain a consistent, equal downward pressure against the clevis members 22 and discs 24 and 25. Since the cylinders 42 are double acting, they may also be utilized to lift the discs from engagement with the ground for transportation purposes.

The particular arrangement and positioning of the discs 24 and 25 is illustrated in some detail in FIG. 3 and 4. It may be noted that the coulter disc 24 is positioned slightly ahead of the furrow opening disc 25. By thusly positioning the coulter disc 24, only one element in needed to penetrate the soil while the remaining furrow opening disc 25 is used to actually form the V shaped furrow into which seeds are to be planted.

It may also be noted in FIG. 2 that alternating pairs of discs 21 are offset with respect to the forward path of travel. With this arrangement, closer lateral spacing of the assemblies 20 may be utilized between the supporting wheels 12 without increasing the chances for fouling of the assemblies due to field trash engaging between the spaced disc pairs 21.

In operation, the seed drill 10 is pulled along a field in the direction shown by arrow 13. The discs are urged downwardly by the cylinders 42 to engage the ground with the coulter discs 24 first cutting through the ground surface and the furrow opening discs 25 spreading the soil outwardly to form a V shaped groove. It should be noted that the discs rotate freely in their journal bearings 23 as the drill moves along. Seeds are delivered through the discharge tubes 15 and directed through open tube ends 34 thereof to fall directly onto the point of convergence 32 of each pair of discs 21. As the discs continue to rotate, the seeds move along in a rearward direction until the spacing between the discs become greater than the dimension of the seed. The seed then drops into the furrow. The rolling action of the two discs serves to separate clusters of seeds and enables each seed to drop independently into the furrow in an evenly spaced relationship to the remainder of seeds in the furrow. Such a spacing may be predetermined by the angular arrangement of the discs to one another and the relative forward speed of the seed drill. In either condition, the seeds are placed within the furrow independently of one another and are spaced equally apart.

Rather than utilizing cylinders 42 to control the depth of furrows, I provide an annular flange 30 on each coulter disc 24. The flanges 30 prevent downward movement of the disc pairs 21 beyond a desired furrow depth in the soil. The ram cylinders 42 operate against the weight of the frame 11 and equipment carried thereby to provide equal amount of downward pressure to each of the seed planter assemblies 20 regardless of tension and differing soil conditions.

Fertilizer is discharged simultaneously with the seeds through the discharge tubes 15a. The tubes 15a are preferably located behind the seed tubes 15 a distance such that some soil will fall back into the furrows to cover the seeds before the fertilizer is discharged. A second fertilizer may also be broadcasted over the ground surface simultaneously with the planting and furrow fertilizing operation. This method of application is well known and may involve the addition of a third hopper and known spreading apparatus to the framework 11.

It may have become obvious from the above disclosure that various changes and modifications may be made therein without departing from the scope of my invention. Therefore, only the following claims are to be taken as definitions of this invention.

What I claim is:

1. A tractor drawn no till seed drill for planting seeds in previously harvested plots that have not since been tilled with the seeds being evenly spaced along a furrow formed in the stubble ground, while moving in a forward direction, comprising:
   a wheel supported framework;
   a hopper on said framework for receiving seeds in bulk;
   a seed delivery tube extending downwardly from said hopper to an open end;
   a coulter disc operatively connected to said framework for rotation about a first axis;
   a furrow opening disc operatively connected to said framework for rotation about a second axis inclined to and rearward of said first axis with said furrow opening disc tangentially engaging said coulter disc at a point of convergence elevationally below said first and second axes; and
   wherein said seed delivery tube open end is located directly above said point of convergence.

2. The seed drill as recited in claim 1 further comprising a clevis member pivotably mounted at one end to the framework and rotatably mounting said coulter disc and furrow opening disc at a remaining bifurcated end between the furcations thereof;
   cylinder means connecting the clevis member and frame selectively operable through a pressure supply to exert a downward force on the clevis member and to thereby urge the discs downwardly.

3. The seed drill as recited in claim 2 wherein a plurality of pairs of coulter discs and furrow opening discs are mounted by a like number of clevis members to said framework and wherein said cylinder means is comprised of a double acting hydraulic cylinder for each clevis member with said cylinders being connected in a parallel hydraulic circuit to a common pressure supply so equal force is exerted against each clevis member.

4. The seed drill as recited in claim 3 wherein the plurality of pairs of coulter discs and furrow opening discs are staggered with alternate pairs forward of the remaining pairs.

5. The seed drill as recited in claim 1 wherein said coulter disc and furrow opening disc are mounted between furcations of a clevis member having one end pivotably mounted to said framework;
   wherein said first and second axes are inclined relative to each other so the coulter disc and furrow opening disc converge forwardly and downwardly and diverge rearwardly and upwardly so said point of convergence is located forward of said first and second axes; and
   a fertilizer hopper mounted to the framework having a fertilizer discharge tube leading therefrom to a discharge point rearward of the seed delivery tube open end.

6. The seed drill as recited in claim 1 wherein one of said discs includes an annular flange of a diameter less than the diameter of the furrow opening disc for regulating furrow depth.

7. The seed drill as recited in claim 5 wherein a plurality of pairs of coulter discs and furrow opening discs are provided along with a like number of clevis members mounted to the framework such that alternate pairs of coulter discs and furrow opening discs are located forward of the remaining pairs of coulter and furrow opening discs.

8. In a seed drill of the type having a wheel supported frame, a hopper on the frame for receiving seeds in bulk and a seed discharge tube leading downwardly from the hopper to an open end; a seed planting assembly comprising:
   a clevis member having one end thereof pivotably mounted to the framework and a bifurcated end extending rearwardly therefrom;
   a coulter disc rotatably mounted to one of the furcations of the clevis member for rotation about an inclined first axis;
   a furrow opening disc rotatably mounted to a remaining furcation of the clevis member for rotation about an inclined second axis rearward of the first axis so the coulter disc and furrow opening disc diverge upward and rearwardly of the axes and converge downward and forwardly of the axes and come into tangential contact at a point of convergence below the axes;
   wherein the open end of the seed discharge tube is located directly above the point of convergence; and
   cylinder means connecting the clevis member and framework operated through a pressure supply to exert a downward force against the clevis member and thereby urge the coulter disc and furrow opening disc downwardly.

9. In a seed drill as recited in claim 8 wherein a plurality of pairs of coulter discs and furrow opening discs are provided and mounted to a like number of clevis members;
   the clevis members being pivotably mounted to the framework in staggered relation so alternate pairs of coulter discs and furrow opening discs are located forward of the remaining pairs; and
   the cylinder means comprises a hydraulic cylinder for each clevis member connected between the clevis member and the framework, the hydraulic cylinders being connected to one another and to a common pressure supply in a parallel hydraulic circuit so that equal downward force may be applied against each clevis member.

10. In a seed drill as recited in claim 8 wherein the point of convergence is located forward of the first and second axes; and an annular flange mounted coaxially to one of the discs of each pair for preventing furrow formation beyond a desired depth.

* * * * *